United States Patent
Niemeyer et al.

[11] Patent Number: 6,144,884
[45] Date of Patent: Nov. 7, 2000

[54] TELEOPERATION WITH VARIABLE DELAY

[75] Inventors: Günter Niemeyer, Mountain View, Calif.; Jean-Jacques E. Slotine, Cambridge, Mass.

[73] Assignee: Massachusetts Institute of Technology, Cambridge, Mass.

[21] Appl. No.: 09/062,443

[22] Filed: Apr. 17, 1998

[51] Int. Cl.[7] .................................................. G05B 15/00
[52] U.S. Cl. ................... 700/3; 700/4; 700/245; 318/568.11; 709/204; 709/208
[58] Field of Search .......................... 700/3; 318/568.11; 709/204, 208

[56] References Cited

U.S. PATENT DOCUMENTS

| | | | |
|---|---|---|---|
| 4,304,001 | 12/1981 | Cope | 714/4 |
| 4,347,563 | 8/1982 | Paredes et al. | 364/137 |
| 4,700,292 | 10/1987 | Campanini | 709/211 |
| 4,803,613 | 2/1989 | Kametani et al. | |
| 4,907,146 | 3/1990 | Caporali | 709/204 |
| 5,266,875 | 11/1993 | Slotine et al. | 318/568.11 |
| 5,276,900 | 1/1994 | Schwede | 709/208 |
| 5,446,846 | 8/1995 | Lennartsson | 710/100 |
| 5,784,542 | 7/1998 | Ohm et al. | 395/95 |

OTHER PUBLICATIONS

Niemeyer, "Using Wave Variables in Time Delayed Force Reflecting Teleoperation," Dept. of Aeronautics and Astronautics, MIT, doctoral thesis: title page, abstract. pp. 5, 7–11, 13, 198, 1996.

*Primary Examiner*—Ayaz R. Sheikh
*Assistant Examiner*—Frantz B. Jean
*Attorney, Agent, or Firm*—Fish & Richardson P.C.

[57] ABSTRACT

Time variation of communication delay may contribute directly to the instability of a distributed control system, such as a teleoperator system, for example, by communication paths themselves acting as sources of energy. The invention provides a distributed control system, such as a teleoperator system or a virtual reality system, that includes a master system, a slave system, and a communication system coupling the master system and the slave system. The communication system includes a bidirectional communication channel with time-varying delay, and an energy conservation filter coupled to the bidirectional communication channel for limiting a total energy provided by the communication system to the master and slave systems, thereby contributing to the overall stability of the system. The communication channel can be a data network, such as the Internet, which can exhibit significant variation in transmission delay.

7 Claims, 7 Drawing Sheets

TELEOPERATION WITH VARIABLE DELAY

BACKGROUND

The invention relates to teleoperation with time-varying delay of control or feedback signals.

Teleoperation involves the manipulation and control of objects and devices over long distances. Typically, a human operator interacts with a remote environment by physically manipulating an input manipulator, such as a joystick. Control signals, such as position or velocity signals, are derived from the motion of the input manipulator and sent to a distant output manipulator, such as a robotic arm. The output manipulator physically interacts with a remote environment, for example by moving an object, according to the control signals it receives from the input manipulator. In order to improve the operator's ability to control such a remote object, or to provide a more realistic "feel" of the remote environment to the operator, feedback signals, such as forces applied by the remote environment on the remote manipulator, are sent as feedback signals to the input manipulator. The input manipulator provides these feedback signals to the operator, for example, as forces opposing motion of a joystick. Providing feedback information to an operator, and in particular providing force feedback, has been shown to greatly improve the operator's ability to perform a remote manipulation task.

However, teleoperator systems, almost by their very definition, must deal with non-zero transmission times (i.e., delays) for control signals passing between an input manipulator and output manipulator, and for feedback signals passing back to the input manipulator. When the delays are below typical human reaction times, the delays are "transparent" to the operator and do not affect the operator's ability to manipulate the remote environment. However, significant signal delays can occur due to communication over very large distances (e.g., satellite radio channels), due to communication through media with slow signal propagation rates (e.g., underwater acoustic channels), or due to communication using systems that inherently introduce delays (e.g., buffered digital systems).

A virtual reality system is very similar to a teleoperator system except that the remote environment is simulated rather than physical. An operator physically interacts with an input manipulator, such as a joystick, but no physical output manipulator is used. A typical system of this type involves a computer game providing multimodal feedback to the operator including physical (e.g., force) feedback, and visual and aural feedback. A simulation computer performs the role of (i.e., simulates) the output manipulator and remote environment. Also, multiple operators can interact with a single simulated environment. If an operator is distant from the simulation computer, control and feedback signals must be communicated between the operator's computer and the simulation computer. If such signals are sent over a data network, significant transit delays can occur.

It is well known that signal delay in the feedback loop of a feedback control system can introduce instabilities unless explicitly compensated for. This is particularly true of force-reflecting systems with delays in the forward or feedback paths.

In order to preserve stability of a teleoperator system in the presence of a fixed delay in both a forward path and a feedback communication path, a method has been previously disclosed in which signals defined in terms of "wave variables," rather than velocity and force variables, are transmitted over these communication paths. Transmission of wave variable signals in a telerobotic force-reflecting feedback system is described in U.S. Pat. No. 5,266,875, Telerobotic System, issued on May 23, 1991 to J.-J. Slotine and G. Niemeyer, referred to herein as the "previous patent". Various related configurations dealing with fixed delay transmissions between the master system and the slave system are also described by G. Niemeyer in *Using Wave Variables in Time Delay Force Reflecting Teleoperation*, a Ph.D. thesis submitted to the Massachusetts Institute of Technology Department of Aeronautics and Astronautics in September 1996, and referred to herein as the "Niemeyer thesis". Both the previous patent and the Niemeyer thesis are incorporated herein in their entirety by reference.

SUMMARY

Prior art approaches which address fixed delays in the control and feedback paths do not, in general, compensate for time-varying delays in those paths. In fact, such time variation may contribute directly to the instability of a teleoperator system, for example, by communication paths themselves acting as sources of energy.

In one aspect, in general, the invention is a distributed control system, such as a teleoperator system or a virtual reality system, that includes a master system, a slave system, and a communication system coupling the master system and the slave system. The communication system includes a bidirectional communication channel with time-varying delay, and an energy conservation filter coupled to the bidirectional communication channel for limiting a total energy provided by the communication system to the master and slave systems.

The invention can include one or more of the following features.

The communication channel can include a forward path for passing control information from the master system to the slave system and a feedback path for passing feedback information from the slave system to the master system. The conservation filter then includes a forward conservation filter coupling the forward path to the slave system such that the combination of the forward path and forward conservation filter forms a passive system and a feedback conservation filter coupling the feedback paths to the master system such that the combination of the feedback path and the feedback conservation filter forms a passive system.

The forward conservation filter can accept a delayed master control signal and a delayed energy-related signal related to the energy provided by the master system in applying the master control signal, and provide a slave control signal such that the energy provided to the slave system in applying the slave control signal does not exceed the energy provided by the master system in applying the master control signal.

The master control signal can include a wave integral signal $$U(t) = \int_0^t u(\tau) d\tau$$

which is an integral of a wave signal $$u(t) = (b\dot{x}(t) + F(t))/\sqrt{2b}$$

which is determined by a velocity $\dot{x}(t)$ and a force $F(t)$ at the master system, and the energy-related signal includes $$E(t) = \int_0^t (u(\tau))^2 d\tau.$$

Advantages of the invention include providing a passive communication system thereby contributing to the stability of a distributed control system, such as a teleoperator system, that passes control or feedback signals through the communication system. The communication system remains passive in spite of time-variation in the communication delay.

Other features and advantages of the invention will be apparent from the following description, and from the claims.

DESCRIPTION

Figure 1:
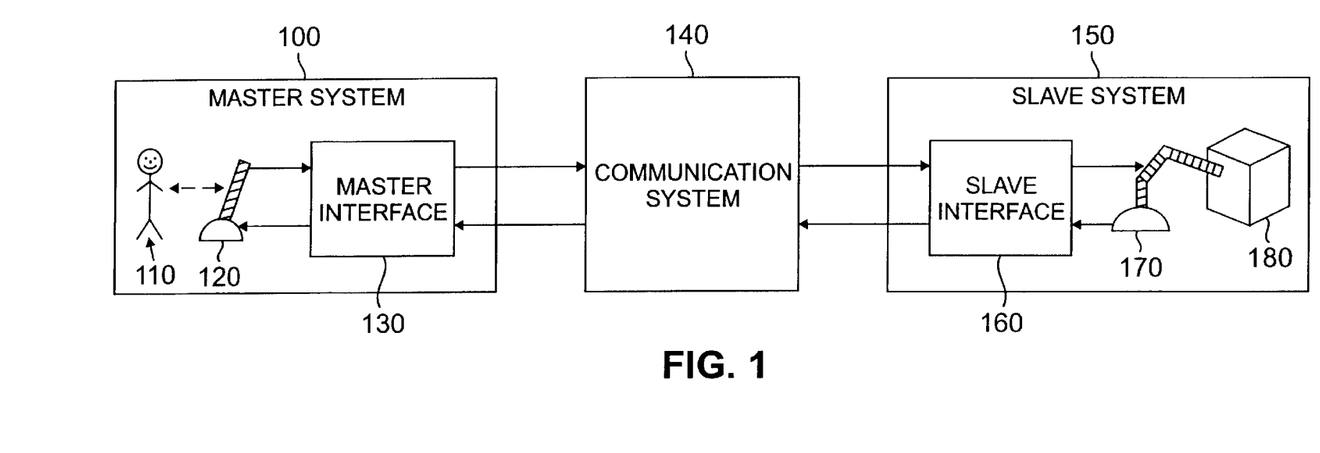
FIG. 1 is a teleoperator system in which a master system and a slave system are coupled through a communication system.

Referring to FIG. 1, a teleoperator system generally includes a master system 100 coupled to a slave system 150 through a communication system 140. Master system 100 includes a human operator 110 who physically interacts with an input manipulator 120, such as a joystick. Operator 110 applies forces to input manipulator 120 and senses the resulting motion of the manipulator. In general, input manipulator 120 has multiple degrees of freedom, for example, three degrees of freedom allowing operator 110 to position the manipulator in three-dimensional space. Input manipulator 120 provides control signals to a master interface 130, and accepts feedback signals from the master interface. For example, the control signals can be electrical position or velocity signals generated by position or velocity encoders or sensors in input manipulator 120, and the feedback signals can be electrical force signals that input manipulator 120 converts into physical forces using electrical amplifiers and motors. Master system 100 also includes a master interface which couples input manipulator 120 to a communication system 140 and transits control information from the input manipulator into the communication system and receives feedback information from the communication system that it provides to the input manipulator.

Slave system 150 includes a physical environment 180, such as a physical object to be manipulated by the operator, and an output manipulator 170, such as a robotic arm, which manipulates physical environment 180, for example by applying forces to the environment which causes the environment to move. A slave interface 160 receives control information from communication system 140 and provides a control signal to output manipulator 170, for example, providing a desired position or velocity signal to the output manipulator. Output manipulator 170 provides a feedback signal to slave interface 160, for example, a signal encoding the force opposing the desired motion indicated in the control signal. Slave interface 160 sends feedback information through communication system 140 to master interface 130.

Communication system 140 supports bidirectional communication between master interface 130 and slave interface 160 and passes control and feedback information between master interface 130 and slave interface 160. Communication system 140 provides digital interfaces to master interface 130 and slave interface 160. Internally, communication system 140 passes the digital information over one or more physical links, for example, over the physical links of a data network. Alternatively, communication system 140 can provide an analog interface to master interface 130 and slave interface 160 and passes the control and feedback signals as encoded analog or digital signals over one or more physical links.

Communication system 140 delays control and feedback signals passing through it. In particular, control information provided to it by master interface 130 is not immediately available to slave interface 160, nor is feedback information provided by slave interface 160 immediately available to master interface 130. The delay can arise from a variety of sources, including, for example, finite propagation speeds of the physical links in the communication system, and, when digitized information is transmitted, digital communication delays due to queuing, routing, and error control within the communication system.

Communication system 140 can also exhibit time-varying delays from a variety of sources and prior approaches that address fixed communication delays may not be adequate to maintain stability of the teleoperator system.

One class of sources of time-varying delay is related to characteristics of the physical links in the communication system. The length of a physical link can be time-varying. For example, space-based or underwater telerobotic applications involving moving vehicles can experience variable transmission times due to motion of the vehicle. Also, the propagation speed through the transmission medium of a physical link can be time varying, for example due to temperature variations of an underwater acoustic communication path. Variations due to motion or variable propagation speeds are typically slow or small, and therefore are generally insignificant from the point of view of stability of an overall teleoperator system.

A second class of sources of time-varying delay in communication system 140 relates to transmission of digitized control and feedback information through a digital communication system. Time-varying delay can result from a variety of sources. These sources include information queuing, routing, and error control. If a physical link is shared to transport several information streams, queuing delays can be introduced. Queuing delays can result in "bursty" delivery of information, for example, if the physical link is essentially time multiplexed. Also, if some of the information streams sharing a physical link have time-varying data rates, queuing delays of the control and feedback information can increase during intervals when other streams have high data rates. Routing can also result in variable delays. For example, communication system 140 can include several paths which couple master interface 130 and slave interface 160. At different times, different paths may be used. As different paths can have different delays, switching between paths introduces time-variation in delay. These changes in delay can be significant, for example, in switching between a satellite and a terrestrial link. Error control can also introduce time-varying delay. Some approaches to error control involve retransmission of lost or damaged information and thereby result in increased transmission delay for the retransmitted information.

Packet-switched data communication systems, and in particular the Internet, can exhibit time-varying delays for some or all of the above reasons. The Internet provides an easily accessible communication system for coupling master and slave systems for teleoperation. However, as the Internet experiences increased usage, at times, delays can be significant and variable. Control and feedback information is transmitted in typically small packets (e.g., 100–1000 bytes) and is routed in real time through a possibly large number of intermediate communication nodes in the network. Average transmission delay ("communication latency") is typically quite low (e.g., 100–1000 ms.) but often, latency increases suddenly, for example, due to competing traffic, rerouting of the signal flow, or error retransmissions. In the extreme, communication can be temporarily interrupted for several seconds. Communication interruptions, and other time-variation in transmission times can lead to instabilities in the teleoperator system if left untreated.

Figure 2:
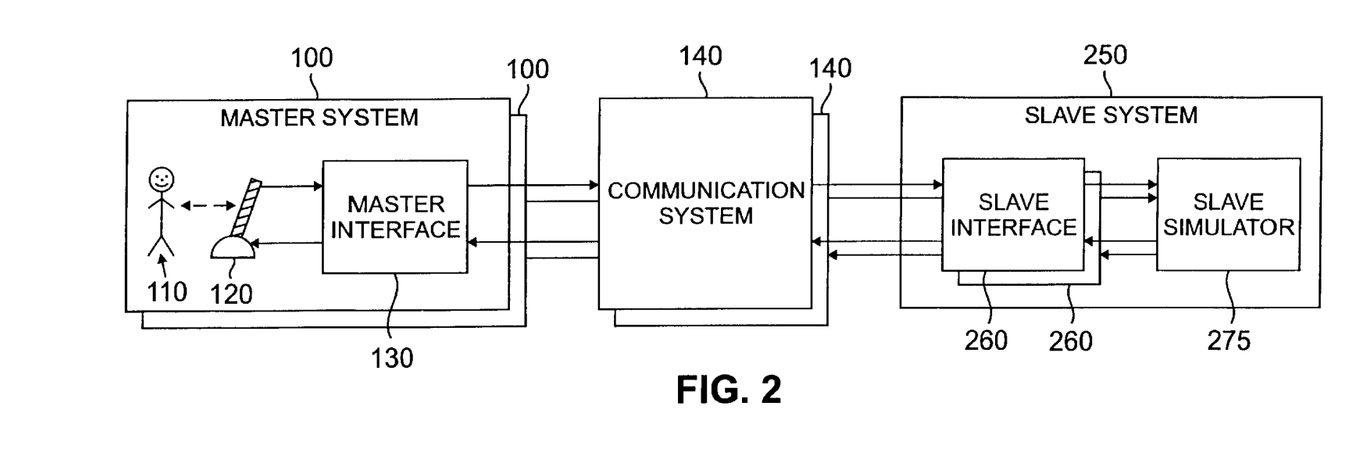
FIG. 2 is a virtual reality system in which multiple master systems are coupled through communication systems to a slave system.

Before discussing the details of the teleoperator system shown in FIG. 1, note that a virtual reality system shown in FIG. 2 shares many of the characteristics of a teleoperator system. In FIG. 2, a single slave system 250 interacts with one or more master systems 100 through communication systems 140. However, unlike slave system 150 of the teleoperator system shown in FIG. 1, slave system 250 includes a software-based slave simulator 275. Slave simulator 275 serves the role of both slave manipulator 170 and physical environment 180 of the teleoperator system. Operator 110 interacts through input manipulator 120 as if he were manipulating a remote physical environment. Multiple operators 110 can interact with the same slave simulator 275. An example of such a slave simulator is a multiperson game in which each operator controls some simulated physical objects (e.g., robots, airplanes etc.). Operators 110 communicate with slave simulator 275 through separate communication systems 140, which can be different communication paths through a single data communication network. In alternative embodiments, both the master system and the slave system can include human operators.

Figure 3:
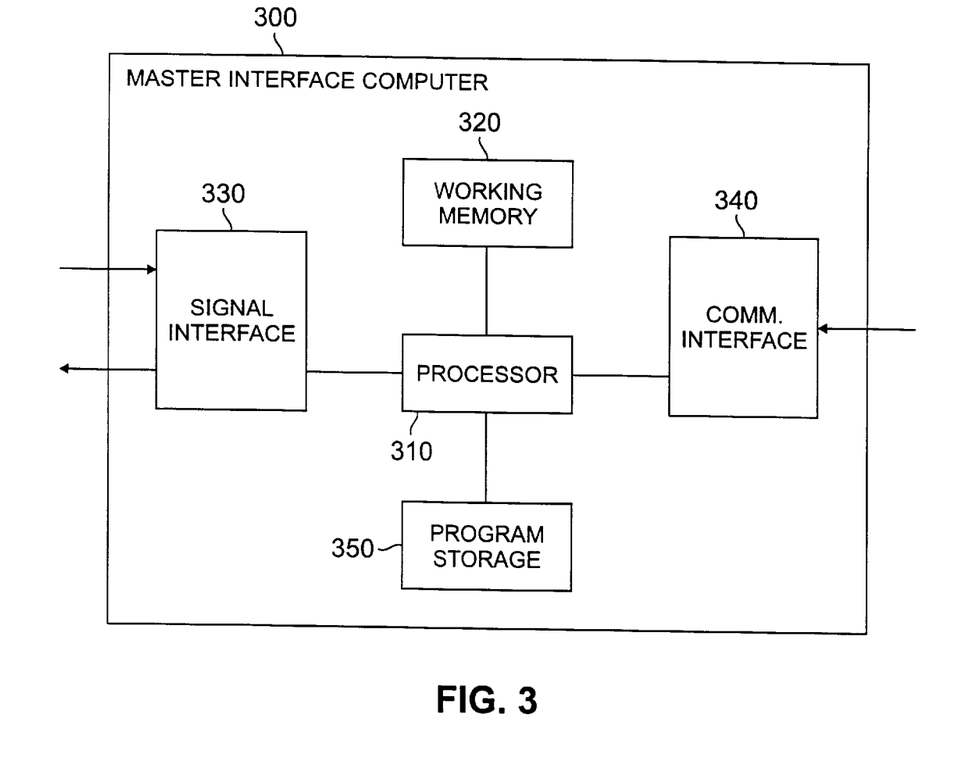
FIG. 3 is a master interface computer.

Referring to FIGS. 1 and 2, in these embodiments, communication system 140 is a data network, and master interface 130 and slave interface 160 are software based systems. Referring to FIG. 3, a master interface computer 300 hosts the software modules that implement master interface 130. Master interface computer 300 includes a signal interface 330 that provides an interface to input manipulator 120. For example, if input manipulator provides and accepts analog signals, signal interface 330 includes an analog-to-digital converter for accepting the control signals, and a digital-to-analog converter for providing the feedback signals to input manipulator 120. Master interface computer 300 also includes a processor 310 which executes the instructions that implement master interface 130, program storage 350 that holds the instructions, and working memory 320 that is used for temporary storage during execution of the implementation of master interface 130. A communication interface 340 couples processor 310 to communication system 140. A similar slave interface computer hosts the modules that implement slave interface 160.

Figure 4:
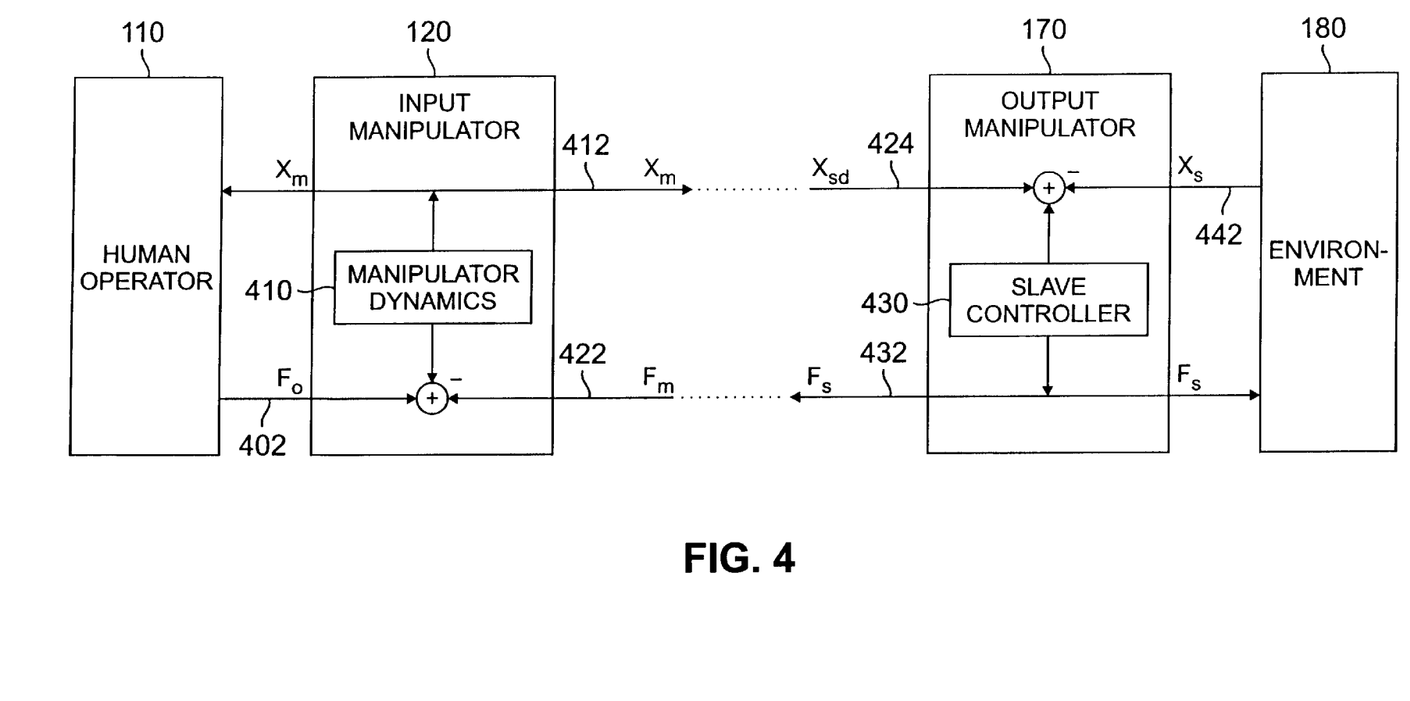
FIG. 4 is a signal flow diagram of an operator coupled to an input manipulator and an output manipulator coupled to an environment.

Referring to the signal flow diagram in FIG. 4, operator 110 can be thought of as providing an operator force signal $F_o$ 402 that acts on input manipulator 120. A master feedback force $F_m$ 422 opposes $F_o$ 402 and their difference acts on manipulator dynamics 410, the dynamical system of the input manipulator, producing a velocity of the input manipulator, master velocity $\dot{x}_m$ 412. Master velocity $\dot{x}_m$ 412 provides operator 110 with feedback. Master velocity $\dot{x}_m$ 412 and is also sent to the slave system as the control signal.

After passing through master interface 130, communication system 140, and slave interface 160 (FIG. 1), master velocity $\dot{x}_m$ 412 is received at output manipulator 170 as slave desired velocity $\dot{x}_{sd}$ 424, which is generally related to a delayed version of master velocity $\dot{x}_m$ 412. Output manipulator 424 also accepts slave velocity $\dot{x}_s$ 442, the true velocity of environment 442 which is being manipulated by the operator. The difference between $\dot{x}_{sd}$ 424 and $\dot{x}_s$ 442 is fed to a slave controller 430 which determines a slave force $F_s$ 432 which is both applied to environment 180. Slave force $F_s$ 432 is sent back to the master system and is received at input manipulator 120 as master feedback force $F_m$ 422, which is generally related to a delayed version of slave force $F_s$ 432.

Note that in the above description, velocities and forces are, in general, vector quantities. In the description that follow, although scalar notation is used, unless otherwise noted, vector quantities can be used, and product terms such as vw should be interpreted as corresponding inner products such as $v^T w$. Also, time dependence of signals (e.g., $\dot{x}_m(t)$ rather than $\dot{x}_s$) is not always indicated if the time dependence is understood from the context.

Figure 5:
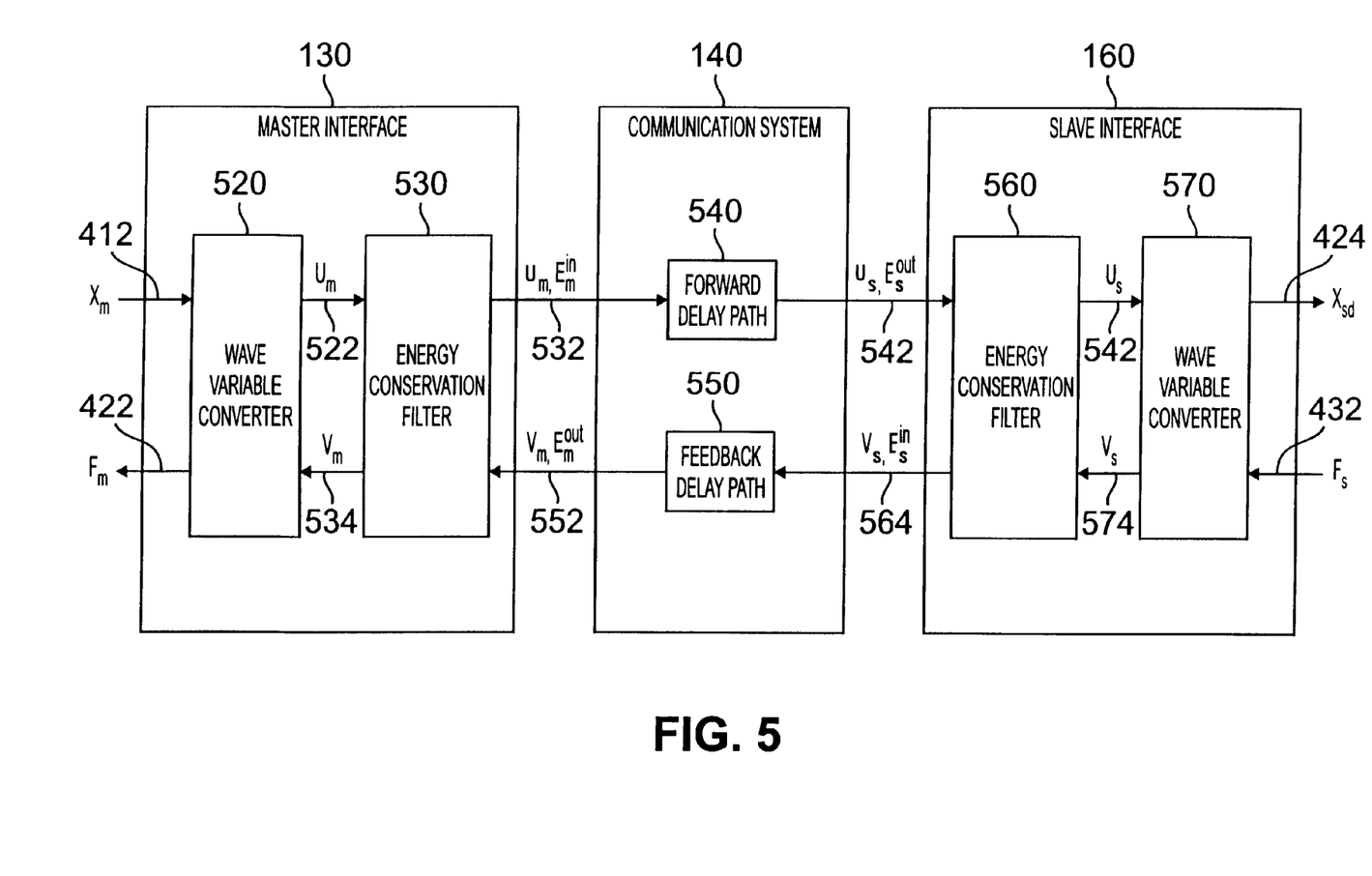
FIG. 5 is a signal flow diagram of a master interface coupled to a slave interface through a communication system.

The portion of the teleoperator system coupling input manipulator 120 and output manipulator 170 (FIG. 4) can be thought of as the "effective" communication system. Referring to FIG. 5, this effective communication system is composed of the cascade of master interface 130, communication system 140, and slave interface 160.

Referring still to FIG. 5, communication system 140 includes a forward delay path 540 through which a control signal passes from master interface 130 to slave interface 160, and a feedback delay path 550, through which a feedback signal passes from slave interface 160 back to master interface 130. The forward and feedback delay paths accept control or feedback signals at their inputs, and, after a time-varying delay, $T_c(t)$ and $T_f(t)$, respectively, provide those signals at their output.

Master interface 130 and slave interface 160 each include a wave variable converter 520 and 570, respectively, and an energy conservation filter 530 and 560, respectively. Wave variable converter 520 accepts master velocity $\dot{x}_m$ 412 and combines it with master feedback force $F_m$ 422 to produce master command wave $u_m$ 522. Wave variable converter 520 also accepts master feedback wave $v_m$ 534 and combines it with master velocity $\dot{x}_m$ 412 to produce master feedback force $F_m$ 422. Wave variable converter 520 is such that its inputs and outputs satisfy the identities $$u_m = (b\dot{x}_m + F_m)/\sqrt{2b}$$

and $$v_m = (b\dot{x}_m - F_m)/\sqrt{2b}$$

where the parameter b is a positive scalar constant if $\dot{x}_m$ and $F_m$ are scalars, and is a symmetric positive definite matrix if they are vectors. The parameter b is a tuning parameter that can be thought of as an an apparent damping of the input manipulator. Note that the total power passed from input manipulator 120 into master interface 130 is $P_m = \dot{x}_m F_m = u_m^2/2 - v_m^2/2$. Therefore $u_m^2/2$ can be viewed as an the power passing from input manipulator 120 to master interface 130 and $v_m^2/2$ can be viewed as an the power passing back from master interface 130 to input manipulator 120.

Wave variable converter 570 satisfies similar identities as an those satisfied by wave variable converter 530, specifically $$u_s = (b\dot{x}_{sd} + F_s)/\sqrt{2b}$$

and $$v_s = (b\dot{x}_{sd} - F_s)/\sqrt{2b}$$

where b is the same parameter as an in wave variable converter 530.

Energy conservation filters 530 and 560 provide interfaces to master and slave command and feedback wave signals, such that the effective communication system, which is made up of master interface 130, slave interface 150, and communication system 140, is passive. The passivity condition on these elements can be expressed as an $$E_{store}(t) = \int_0^t P_{in}(\tau)d\tau = \int_0^t P_m(\tau) - P_s(\tau)d\tau \geq 0$$

where $P_m$ is the power passing from input manipulator 110 to wave variable converter 520, as defined above, and $P_s = u_s^2/2 - v_s^2/2$ is the power passing from wave variable converter 570 to output manipulator 170. $E_{store}(t)$ can be thought of as the energy reserve in the effective communication system at time t. The effective communication system can store energy that it receives, but in order that is satisfies the inequality $E_{store}(t) \geq 0$, it cannot provide more power than it has previously received.

$E_{store}$ can be divided into the energy stored in the forward path, $E_{store}^{forward}$, and the energy stored in the feedback path, $E_{store}^{feedback}$. Energy conservation filters 530 and 560 are such that the forward and feedback paths between wave variable converter 520 and wave variable converter 570 are individually passive, that is:

$$E_{store}^{forward}(t) = \int_0^t u_m^2/2 - u_s^2/2 d\tau \geq 0$$

and $$E_{store}^{feedback}(t) = \int_0^t -v_m^2/2 + v_s^2/2 d\tau \geq 0.$$

The approach by which the energy conservation filters maintain these inequalities is described fully below.

Each energy conservation filter 530 and 560 also serve the role of encoding the control and feedback signals that they accept in terms of wave variables into time integrals of those wave variables. In particular, energy conservation filter 530 accepts $u_m$ 522 and produces paired wave integral signals 532:

$$U_m(t) = \int_0^t u_m(\tau)d\tau$$

and $$E_m^{in}(t) = \int_0^t u_m^2(\tau)d\tau.$$

Similarly, energy conservation filter 560 accepts $v_s$ 574 and produces paired wave integrals 564 signals:

$$V_s(t) = \int_0^t v_s(\tau)d\tau$$

and $$E_s^{in}(t) = \int_0^t v_s^2(\tau)d\tau.$$

Using the identities satisfied by the wave variables, wave integrals $U_m$ and $V_s$ satisfy the identities $$U_m = (bx_m + p_m)/\sqrt{2b}$$

and $$V_s = (bx_{sd} - p_s)/\sqrt{2b}$$

where $$p_m = \int_0^t F_m d\tau \text{ and } p_s = \int_0^t F_s d\tau$$

can be interpreted as an "momentum" terms. Note that by transmitting control information in the form of wave integral $U_m$ slave system 150 determines position control information, $x_m$, directly rather than by relying on integration of a control signal.

As an noted above, energy conservation filters 560 and 530 determine wave signals $u_s$ and $v_m$, respectively, such that the passivity condition is separately satisfied on both the forward and feedback paths of the effective communication system. Specifically, these wave signals are determined by the respective energy conservation filters to satisfy $$E_{store}^{feedback}(t) = E_m^{in}(t) - E_s^{out}(t) = E_m^{in}(t) - \int_0^t u_s^2 d\tau \geq 0$$

and $$E_{store}^{feedback}(t) = E_s^{in}(t) - E_m^{out}(t) = E_s^{in}(t) - \int_0^t v_m^2 d\tau \geq 0$$

corresponding to the forward and feedback paths, respectively.

Figure 6A:
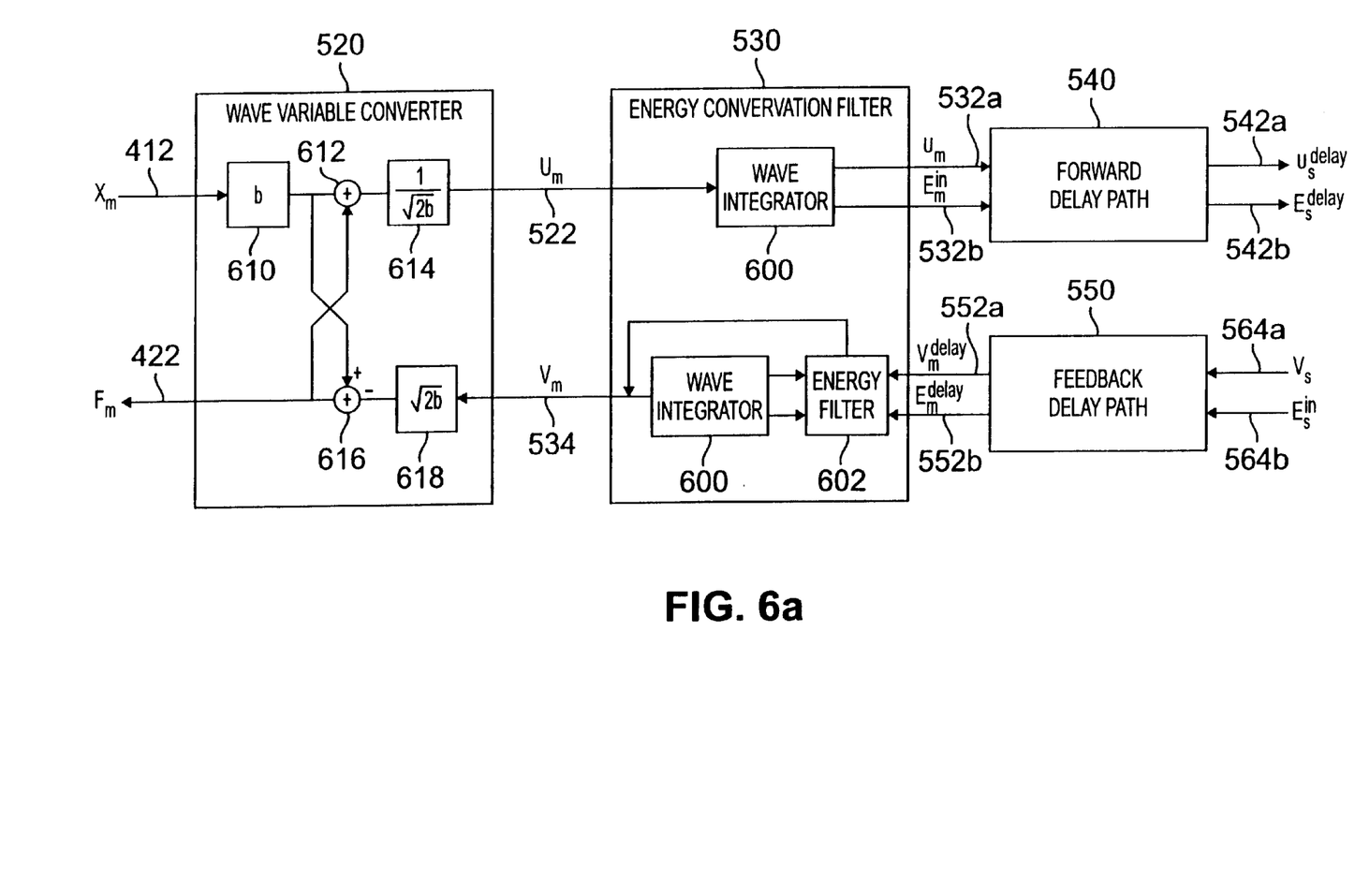
FIGS. 6a and 6b is a signal flow diagram of master and slave wave variable converters and energy conservation filters coupled through forward and feedback delay paths.
Figure 6B:
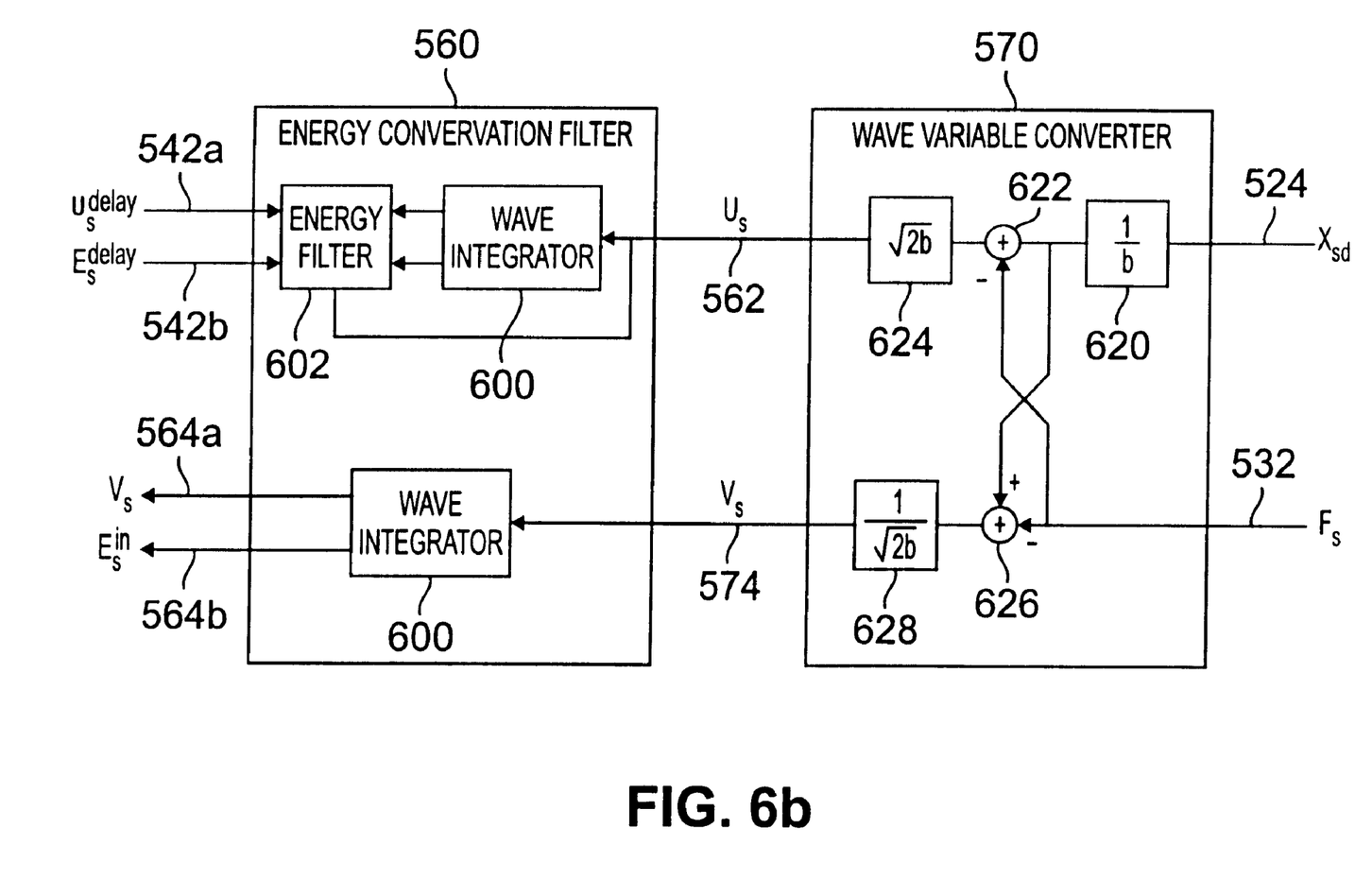

Referring to FIGS. 6a and 6b, causal signal flow paths which implement wave variable converters 520 and 570, and energy conservation filters 530 and 560 are shown. Software implementations of these elements in this embodiment implement equivalent computations to those indicated by the signal flows, but do not necessarily compute the indicated quantities in the manner implied by the signal flow diagrams.

Wave variable converter 520 accepts $\dot{x}_m$ 412 and $v_m$ 534 and produces $F_m$ 422 and $u_m$ 522 such that $$u_m = \sqrt{2b}\dot{x}_m - v_m$$

and $$F_m = b\dot{x}_m - \sqrt{2b}v_m.$$

These transformations of inputs correspond to the signal flows shown in FIG. 6a and to the identities relating the wave variables to the control and feedback variables presented above. Similarly, at slave system 150, wave variable converter 570 accepts $F_s$ 532 and $u_s$ 562 and produces $\dot{x}_{sd}$ 524 and $v_s$ 574 such that:

$$v_s = u_s - \sqrt{2/b}F_s$$

and $$\dot{x}_{sd} = \sqrt{2/b}u_s - (1/b)F_s.$$

Energy conservation filters 530 and 560 correspond to the signal flows shown in FIGS. 6a and 6b. The forward and feedback paths through each energy conservation filter are not coupled. Referring to FIG. 6a, the forward (control) path through energy conservation filter 530 includes a wave integrator 600 that accepts control wave variable signal $u_m$ 522 and produces wave variable integral signals $$U_m(t) = \int_0^t u_m(\tau)d\tau \quad 532a$$

and $$E_m^{in}(t) = \int_0^t u_m^2(\tau)d\tau \quad 532b.$$

(Note that $u_m^2$ inside the integral indicates elementwise squaring of the entries in the vector case). The control wave variable integral signals are passed through forward delay path 540 of communication system 140 and are output from the forward delay path as an delayed control wave variable integral signals $U_s^{delay}(t) = U_m(t-T_c(t))$ 542a and $E_s^{delay}(t) = E_m^{in}(t-T_c(t))$ 542b.

Referring to FIG. 6b, the forward path through energy conservation filter 560 includes an energy filter 602 that accepts $U_s^{delay}(t)$ 542a and $E_s^{delay}(t)$ 542b and determines slave control wave variable $u_s$ 562 such that the forward passivity condition is satisfied. Control wave variable $u_s$ 562 is fed back through wave integrator 600 to energy filter 602 which compares the fed back wave variable integrals with the delayed control wave variable integrals to determine $u_s$ 562.

Figure 7:
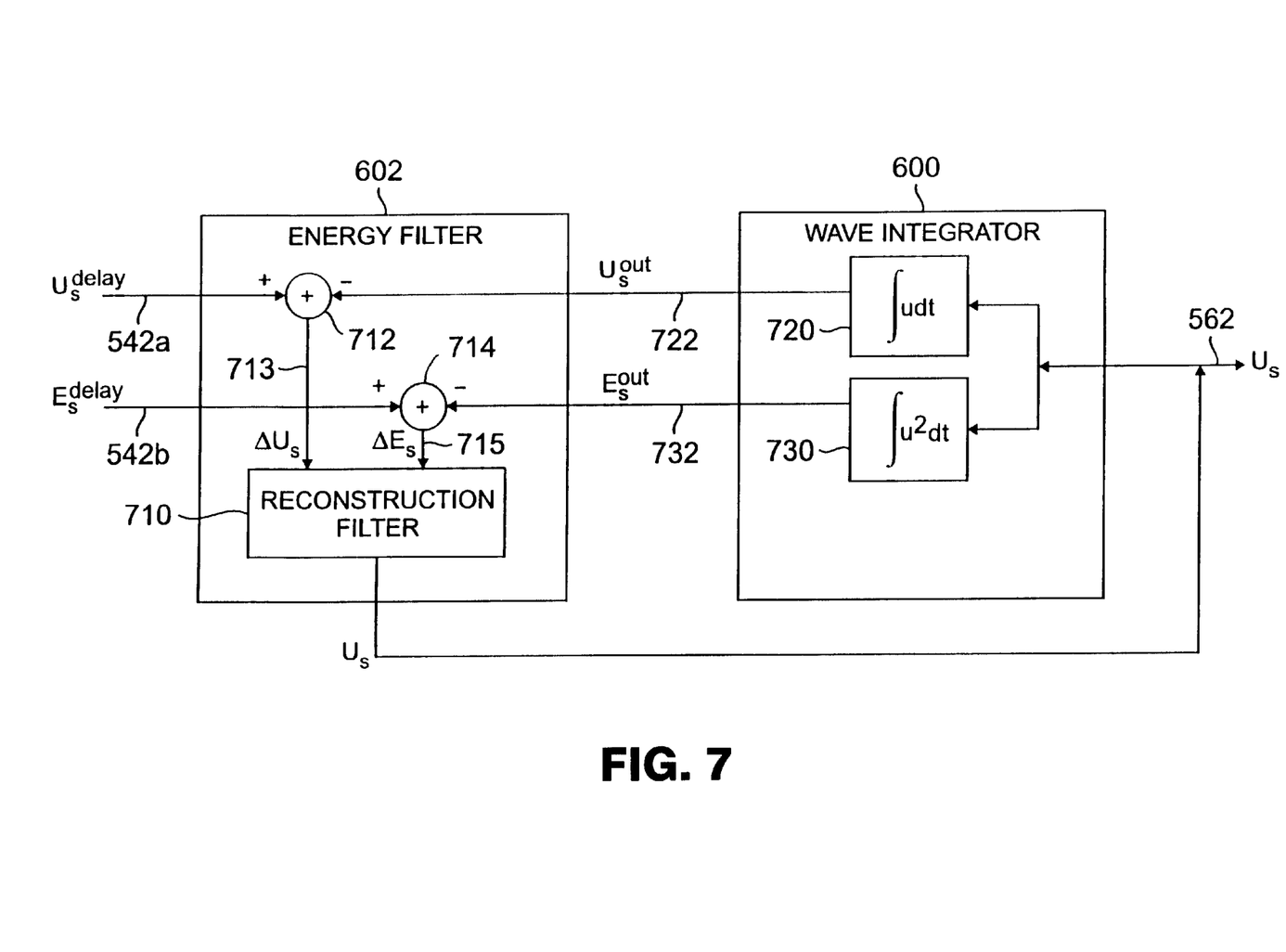
FIG. 7 is a signal flow diagram on an energy filter coupled to a wave integrator.

Referring to FIG. 7, energy filter 602 and wave integrator 600 in energy conservation filter 560 are coupled in a feedback arrangement. Wave integrator 600 accepts $u_s$ 562 and computes an energy signal $$E_s^{out}(t) = \int_0^t u_s^2(\tau)d\tau \quad 732.$$

This energy signal corresponds to the actual energy provided by slave interface 160 to output manipulator 170. Energy filter 602 accepts $E_s^{delay}(t) = E_m^{in}(t-T_c(t))$ 542b, the delayed computation of energy provided by input manipulator 110 to master interface 120, and computes the energy difference $\Delta E_s(t) = E_s^{delay}(t) - E_s^{out}(t)$ 715, which corresponds to the "stored" energy (energy reserve) in the forward path coupling input manipulator 110 and output manipulator 170. A reconstruction filter 710 in energy filter 602 determines $u_s$ 562 to "track" $u_m$ 522 while ensuring that $\Delta E_s(t) \geq 0$.

Referring still to FIG. 7, energy filter 602 accepts $U_s^{delay}(t) = U_m(t-T_c(t))$ 542a, the delayed control wave integral computed in energy conservation filter 530, and computes a control wave integral difference $\Delta U_s(t) = U_s^{delay}(t) - U_s^{out}(t)$ 713, which corresponds to a "distance to go" signal. Reconstruction filter 710 in energy filter 602 determines $u_s$ 562 such that $\Delta U_s(t) \to 0$. That is, reconstruction filter 710 causes output control wave integral $U_s^{out}(t)$ to approach (i.e., closely track) delayed control wave integral $U_s^{delay}(t)$.

A continuous time embodiment of reconstruction filter 710 computes $u_s$ 562 according to $$u_s(t) = 0 \text{ if } \Delta U_s(t) = 0$$

and $$u_s(t) = \alpha \frac{\Delta E_s(t)}{\Delta U_s(t)} \quad \text{if } \Delta U_s(t) \neq 0$$

for a positive constant $\alpha \geq 1$. This constant affects the "smoothness" of the response, the greater $\alpha$ the more smoothing of wave control signal $u_s(t)$. Note that in the vector case, each element of $u_s$ is determined using a scalar equation.

In this embodiment, however, the energy conservation filters are implemented in software, and update their inputs and outputs at regular time intervals, that is at times $\Delta t$, $2\Delta t$, $3\Delta t$ . . . This discrete time implementation corresponds to $\alpha=1$ in the continuous time embodiment. Reconstruction filter 710 therefore actually computes a constant $u_s$ 562 for the interval $[n\Delta t,(n+1)\Delta t)$ according to $$u_s(t) = 0 \text{ if } \Delta U_s(n\Delta t) = 0$$

$$u_s(t) = \frac{\Delta U_s(n\Delta t)}{\Delta t} \quad \text{if } \frac{\Delta U_s(n\Delta t)^2}{\Delta t} \leq \Delta E_s(n\Delta t),$$

and $$u_s(t) = \frac{2\Delta E_s(n\Delta t)\Delta U_s(n\Delta t)}{\Delta U_s(n\Delta t)^2 + \Delta E_s(n\Delta t)\Delta t} \quad \text{if } \frac{\Delta U_s(n\Delta t)^2}{\Delta t} > \Delta E_s(n\Delta t).$$

Note that the second condition corresponds to having sufficient energy reserve to apply a control so that at the end of the interval $\Delta U_s(t)$ is zero, while the last condition corresponds applying a control such that $\Delta E_s(t)/\Delta U_s(t)^2$ has the same value at the end of the interval as it had at the beginning of the interval.

Operation of the system can be understood by considering some of the effects of time-varying delays. As the delay varies, control and feedback signals presented at the outputs of the delay paths become distorted. As delay increases, the signals become "stretched". In the extreme, the output signals become constant and no new values arrive. As delay decreases, the signals are essentially time compressed. Here the extreme can lead to "shock waves" where an entire interval of a control signal can arrive at a single time (for example, as multiple data packets arrive essentially simultaneously from a data network).

If wave variables themselves were transmitted through the communication system, due to the effective time warping causes by the time-varying delays, in general, $$\int_0^{\tau-T_c(t)} u_m^2(\tau)d\tau \neq \int_0^t u_m^2(\tau - T_c(\tau))d\tau,$$

that is, the energy input to the delay path up to time $t-T_c(t)$ is exactly extracted from the delay path. Also, as a result of the signal expansion and compression, the frequency content changes and may cause other unexpected results.

The effect of reconstruction filter 710 can be thought of as an a filtering of the "distance to go" signal $\Delta U_s(t) = U_s^{delay}(t) - U_s^{out}(t)$ 713. Note first that the effect of reconstruction filter 710 is to maintain a fixed ratio $$\frac{\Delta E_s(t)}{\Delta U_s(t)^\alpha} = c,$$

where the constant c is determined by the initial conditions of the filter. The impulse response of such a filter can be written for $\Delta U_s(t) \neq 0$ as an $$u_s(t) = \alpha c \Delta U_s(t)^{\alpha-1},$$

which for $\alpha=1$ is a constant until the "distance to go" is reduced to zero, and for $\alpha>1$ corresponds to a smoothed decay of the distance to go.

Alternatively, in order to limit the bandwidth of $u_s(t)$ to approximately $\lambda_{max}$, reconstruction filter 710 can compute $u_s$ 562 according to $$u_s(t) = \alpha \frac{\min(\Delta E_s(t), (\lambda_{max}/2)\Delta U_s(t)^2)}{\Delta U_s(t)} \quad \text{if } \Delta U_s(t) \neq 0.$$

This has the effect of further smoothing the control output.

If the communication system in fact does not exhibit time-varying delays, but instead simply has a fixed delay in the forward and feedback delay paths, this system essentially reduces to the approach presented in the previous patent. Specifically, the output of energy conservation filter 710 becomes $u_s(t) = u_m(t-T_c)$ for the fixed delay $T_c$. Furthermore, if the communication system in fact does not exhibit any delay, then the wave variable filters and the communication system have no effect on the system and essentially $\dot{x}_s(t) = \dot{x}_m(t)$.

Other embodiments can use somewhat different approaches to ensuring passivity of an effective communication system coupling an input manipulator and an output manipulator. For instance, in the described embodiment, the forward and feedback paths of the effective communication system are maintained to be separately passive. Alternative energy conservation filters can maintain the joint passivity of the forward and feedback paths, for example, where one path provides energy to the other path. Different energy conservation filters can be used at each end of the communication system, for example, by ensuring passivity using as an energy filter only at the slave end of the communication system. Also, in the describe embodiment, a vector wave variable can be viewed as passing through a parallel set of delay paths each with the same delay and the passivity condition is maintained separately for each of these paths. A joint passivity condition for all the dimensions of the wave variable can also be used.

In the description above, the energy being conserved in the communication system is "virtual" in that "physical" energy is not truly passed through the communication system between the master system and the slave system. The energy conservation relation accounts for power flowing through interfaces between the communication system and the master and slave systems, but the communication system does not actually store physical energy. Furthermore, stability of a distributed system can be affected by conserving other "energy" terms that have energy-like properties using the described approach. For instance, in the description above, "energy" corresponds to an integral of a product of a physical input force and a physical output velocity, however, the approach can also be applied to conservation of another type of "energy" which is the integral of a product of an input variable and an output variable at an interface.

Other control signals can alternatively be transmitted over the communication system. For instance, a time sampled control wave signal can be transmitted, and the wave variable integrals can be reconstructed after the wave variable time samples are received from the communication system. Also, other types of control variables can be constructed, as long as an "energy reserve" can be computed for the effective communication system, and the received control and feedback signals can be filtered to ensure that the energy reserve is not depleted. Furthermore, alternative embodiments may allow the energy reserve to be negative at times, for example, for short periods of time, while still maintaining stability of the teleoperator system.

It is to be understood that the foregoing description is intended to illustrate and not limit the scope of the invention, which is defined by the scope of the appended claims. Other aspects, advantages, and modifications are within the scope of the following claims.

What is claimed is:

1. A control system comprising:
   a master system, including a master controller and a master interface for coupling the master controller to a communication system; and
   a slave system, including a slave controller and a slave interface for coupling the slave controller to the communication system;
   wherein the master and slave interfaces are configured to communicate through said communication system over a bi-directional communication path with time-varying delay and to form a combined communication system that includes the bi-directional communication path and the master and slave interfaces for coupling the master and slave controllers; and
   wherein the master interface and slave interface together include an energy conservation filter for coupling to the bi-directional communication path and said filter is configured to limit a total energy provided by the combined communication system to the master and slave controllers.

2. The system of claim 1 wherein the bi-directional communication path includes a forward path for passing control information from the master controller to the slave controller and a feedback path for passing feedback information from the slave controller to the master controller, and wherein the conservation filter includes:
   a forward conservation filter at the slave interface such that the combination of the forward path and forward conservation filter forms a passive system; and
   a feedback conservation filter at the master interface such that the combination of the feedback path and the feedback conservation filter forms a passive system.

3. The system of claim 2 wherein the forward conservation filter is configured to accept from the forward path a delayed master control signal and a delayed energy-related signal related to an energy provided by the master controller in applying the master control signal, and is configured to provide a slave control signal such that the energy provided to the slave controller in applying the slave control signal does not exceed the energy provided by the master controller in applying the master control signal.

4. The system of claim 3 wherein the master control signal includes a wave integral signal $$U(t) = \int_0^t u(\tau)d\tau$$

which is an integral of a wave signal $$u(t)=(b\dot{x}(t)+F(t))/\sqrt{2b}$$

which is determined by a velocity $\dot{x}(t)$ and a force $F(t)$ at the master system, and the energy-related signal includes $$E(t) = \int_0^t u(\tau)^2 d\tau.$$

5. A method for passing control and feedback information through a communication system with time-varying delay including:
    accepting an input control signal;
    determining a transmission control signal encoding control information in the input control signal;
    determining an energy signal related to the energy provided in the input control signal;
    sending the transmission control signal and the energy signal through the communication system;
    receiving a delayed transmission control signal and a delayed energy signal from the communication system, wherein said delayed transmission control signal is the transmission control signal with a time-varying delay and said delayed energy signal is the energy signal with a time-varying delay;
    computing an output control signal such that the output control signal tracks the delayed transmission control signal and the energy provided by the output control signal does not exceed the energy indicated in the delayed energy signal.

6. Software stored on a computer readable medium comprising instructions for causing a computer to perform the functions of:
    receiving a delayed control signal and a delayed energy signal from a communication system;
    computing an output control signal such that the output control signal tracks the delayed control signal and the energy provided by the output control signal does not exceed the energy indicated in the delayed energy signal;
    providing the output control signal to a slave control system;
    accepting a feedback signal from the slave control system;
    computing a feedback energy from the feedback signal; and
    transmitting the feedback signal and the feedback energy to the communication system.

7. A method comprising:
    receiving a delayed control signal and a delayed energy signal from a communication system;
    computing an output control signal such that the output control signal tracks the delayed control signal and the energy provided by the output control signal does not exceed the energy indicated in the delayed energy signal;
    providing the output control signal to a slave control system;
    accepting a feedback signal from the slave control system;
    computing a feedback energy from the feedback signal; and
    transmitting the feedback signal and the feedback energy to the communication system.

* * * * *